United States Patent
Blanchard et al.

(10) Patent No.: US 8,023,627 B1
(45) Date of Patent: Sep. 20, 2011

(54) METHOD AND APPARATUS FOR RETRIEVING INFORMATION FROM APPLIANCES

(75) Inventors: Harry Blanchard, Rumson, NJ (US); Steven H. Lewis, Middletown, NJ (US); Gregory Pulz, Cranbury, NJ (US); Lan Zhang, Freehold, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1301 days.

(21) Appl. No.: 11/616,728

(22) Filed: Dec. 27, 2006

(51) Int. Cl.
*H04M 11/00* (2006.01)
(52) U.S. Cl. .............. 379/93.01; 379/90.01; 340/870.07
(58) Field of Classification Search ............. 340/870.07; 379/90.01, 93.01
See application file for complete search history.

(56) References Cited

U.S. PATENT DOCUMENTS

| | | | | |
|---|---|---|---|---|
| 5,127,045 A | * | 6/1992 | Cragun et al. | 379/67.1 |
| 6,804,536 B1 | * | 10/2004 | Bultman | 455/557 |
| 7,194,072 B2 | * | 3/2007 | Gamble | 379/102.03 |
| 2002/0054601 A1 | * | 5/2002 | Barraclough et al. | 370/401 |
| 2003/0072429 A1 | * | 4/2003 | Slobodin et al. | 379/202.01 |
| 2003/0179867 A1 | * | 9/2003 | Piepho et al. | 379/90.01 |
| 2004/0054747 A1 | * | 3/2004 | Breh et al. | 709/208 |
| 2005/0049004 A1 | * | 3/2005 | Bultman | 455/557 |
| 2005/0203647 A1 | * | 9/2005 | Landry et al. | 700/83 |
| 2007/0250580 A1 | * | 10/2007 | Caspi et al. | 709/206 |
| 2009/0116414 A1 | * | 5/2009 | Or et al. | 370/276 |

FOREIGN PATENT DOCUMENTS

EP  0516210 A1 * 5/1992

* cited by examiner

*Primary Examiner* — Timothy Edwards, Jr.

(57) ABSTRACT

A method and apparatus for retrieving information from household appliances are disclosed. For example, the method receives a request from a user of an appliance. The method then receives stored information from the appliance as one or more Dual Tone Multi-Frequency (DTMF) signals.

20 Claims, 4 Drawing Sheets

100

METHOD AND APPARATUS FOR RETRIEVING INFORMATION FROM APPLIANCES

The present invention relates generally to monitoring of customer endpoint devices over communication networks and, more particularly, to a method and apparatus for retrieving information from household appliances over a communications network.

BACKGROUND OF THE INVENTION

Household appliances such as washers, dryers, irons, microwave ovens, gas ranges, blenders, dishwashers, refrigerators, lawn mowers, etc. are typically used for limited purposes, and are built without any capability to be connected to a communications network. As such, when a household appliance has a problem, the consumer has to call a telephone number to report the problem and/or to schedule an appointment for service. Generally, the service centers receiving calls from appliance owners have Interactive Voice Response (IVR) systems that prompt for appliance information, e.g., a serial number, a model number, the manufacturing date, the purchase date, the purchase location, the problems with the appliance, and so on. Unfortunately, consumers often have problems providing the requested information. For example, the serial number, model number, etc. may not be easily accessible. In another example, the customer may not have registered the appliance when the appliance was purchased and the customer may no longer be able to locate the requested information.

Therefore, there is a need for a method and apparatus to retrieve information from household appliances.

SUMMARY OF THE INVENTION

In one embodiment, the present invention discloses a method and apparatus for retrieving information from household appliances. For example, the method receives a request from a user of an appliance. The method then receives stored information from the appliance as one or more Dual Tone Multi-Frequency (DTMF) signals.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for retrieving information from household appliances. Although the present invention is discussed below in the context of retrieving information over IP networks, the present invention is not so limited. Namely, the present invention can be applied to retrieve information over any network, e.g., plain old telephone (POTS) network, the Time Division Multiplexed (TDM) network, any cellular network, etc. Although the terms "residence" and "consumer" are used below, this invention is not limited to residential applications. Instead, the present invention can be applied to any device deployed in a residence, a business, etc., where such device is without a communication system that may be used for connecting the device to a communication network.

In one embodiment, the present invention provides a method for retrieving information from household appliances by placing information that may be retrieved in the appliance itself, and providing a method for retrieving the information. In order to clearly illustrate the teachings of the current invention, the following networking terminologies will first be described:

Dual Tone Multi-Frequency (DTMF); and

Household appliance (or simply appliance).

Dual Tone Multi-Frequency (DTMF) is the signal a telephone generates when a user presses a key on an ordinary telephone, e.g., a user presses keys 0 to 9. With DTMF, each key that is depressed generates two tones of specific frequencies, e.g., one tone is generated from a high-frequency group of tones and the other from a low frequency group.

A household appliance (or simply an appliance) refers to a device such as a washer, a dryer, an iron, a microwave oven, an oven, a gas range, a blender, a dishwasher, a refrigerator, a lawn mower, etc. that is typically built without any communication capability and without being able to be connected to a communications network.

In one embodiment, the current invention enables the appliance to generate a Dual Tone Multi-Frequency (DTMF) signal that is suitable for input into a telephone system. The appliance generates the DTMF signal when a customer initiates a request to provide stored information. For example, a customer may press a button such that the appliance begins generating DTMF signals that correspond to the appliance's model number, serial number, the manufacturer name, the manufacturing date and/or time, the manufacturing location, the purchase date, the purchase location, one or more detected problems with the appliance and so on. Note that some appliances already have the capability to generate primitive sounds. For example, a microwave oven beeps when a heating cycle is completed. However, the current invention enhances the ability to generate sounds by enabling the appliance to generate DTMF signals.

Figure 1:
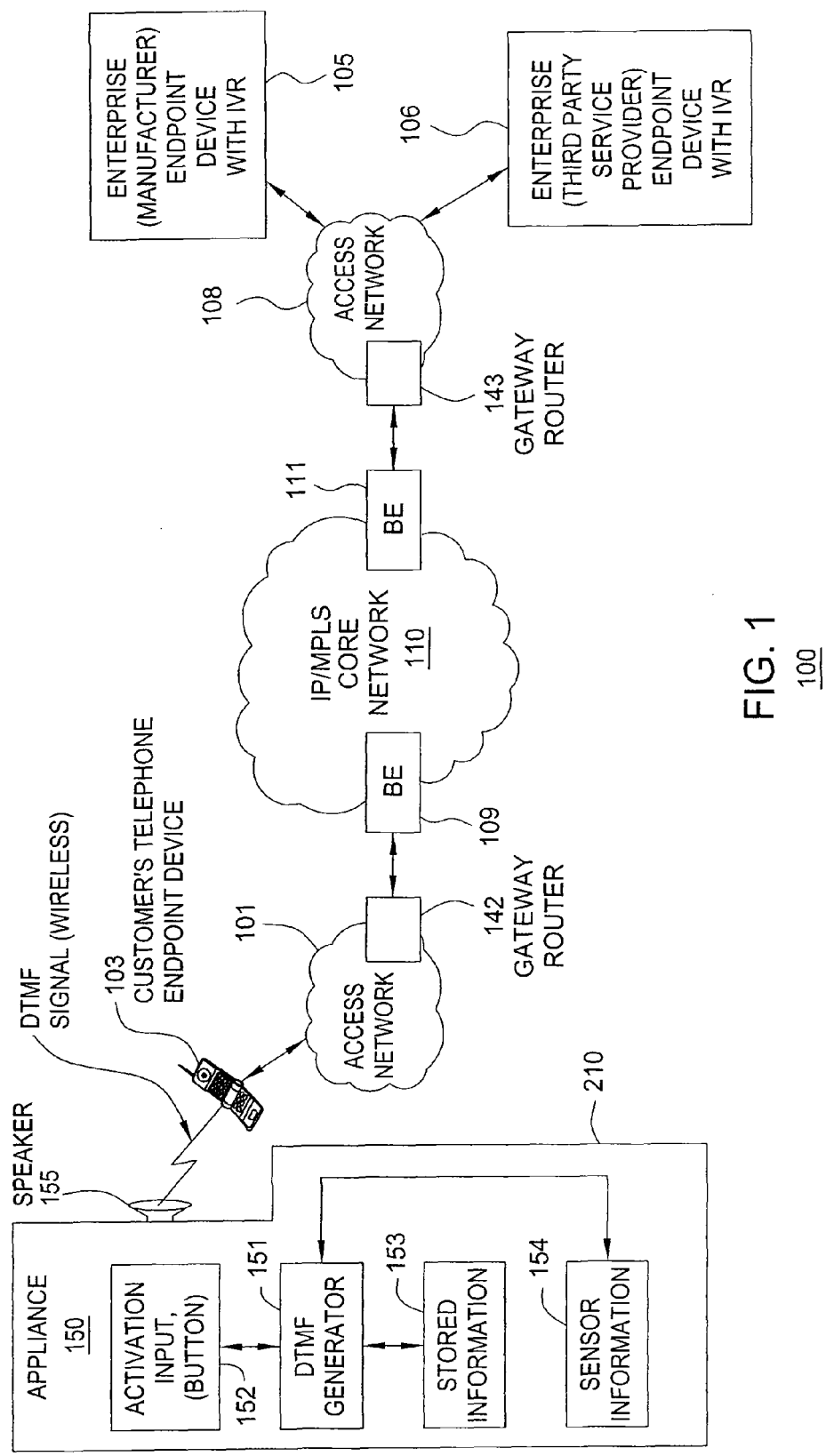
FIG. 1 illustrates an exemplary network with the present invention for retrieving information from appliances.

FIG. 1 illustrates an exemplary network 100 with the present invention for retrieving appliance information. For example, the endpoint device (e.g., a telephone handset, a cellular phone, a cordless phone, and so on) 103 is connected to an access network 101 for sending and receiving voice and data packets to a plurality of endpoint devices 105 and 106. Voice packets originated by endpoint device 103 reach an IP/MPLS core network 110 via a gateway router 142, and a border element 109. The packets traverse the IP/MPLS core network 110 from the border element 109 to the border element 111 towards gateway router 143 located on an access network 108. The endpoint devices 105 and 106 are connected to access network 108 for sending and receiving voice and data packets. The access networks 101 and 108 may each comprise a digital subscriber line (DSL) network, a broadband cable access network, a local area network (LAN), a wireless access network (WAN), and the like.

In one embodiment, the endpoint device 103 is a telephony endpoint device being used by a customer. The endpoint devices 105 and 106 are endpoint devices deployed by an enterprise with an Interactive Voice Response (IVR) system. In one example, the enterprise is the manufacturer of an appliance 150. In another example, the enterprise is a third party service provider for an appliance 150. The appliance 150 also has a DTMF signal generator 151 that may be activated via an activation input interface 152 (e.g., a button, a dial, a touch screen display, and the like) for generating DTMF signals via an output device, e.g., a speaker 155. The appliance also stores some information such as manufacturer data (e.g., the appliance's model number, serial number, the manufacturer name, the manufacturing date and/or time, the manufacturing location, manufacturer warranty, and so on) and/or purchase data (e.g., date of purchase, location of purchase, name of a store, sales associate name, service contract terms, third party extended warranty and so on) in a storage device 153 (e.g., a non-volatile memory device and the like), where the stored information can be provided in the form of DTMF signals via the DTMF signal generator 151. Sensor information or data may also be stored in a storage device 154 (e.g., a non-volatile memory device and the like). Sensor information or data can be generated and stored in response to running a diagnostic routine or a self test.

For example, in operation, the customer may originate a call to the manufacturer 105 of the appliance or to a third party service provider 106 via the telephony endpoint device 103. The IVR system in the endpoint system 105 or 106 may prompt the user to provide pertinent appliance information. For example, after a call connection is established, the IVR may provide the following pre-recorded message: "Please provide the appliance information directly from the appliance by engaging the input interface". In turn, the customer then places the telephony endpoint device 103 in proximity to speaker 155 and engages the input interface 152. When activated, the DTMF signals representative of the stored information in storage device 153 and/or the stored sensor information in storage device 154 are output via speaker 155. The output from speaker 155 is provided as an input to the telephony endpoint device 103 by placing the device 103 in close proximity to speaker 155.

In this manner, pertinent information of the appliance is quickly and easily provided to the manufacturer 105 of the appliance or to a third party service provider 106 without significant effort from the customer. There is no need for the customer to obtain the appliance information (which may be difficult to access or is not easily remembered by the customer) and to manually provide the appliance via the telephony endpoint device 103. Furthermore, there is no need to install expensive communication systems in the household appliances, or to wire the household appliances for communicating with a communication network.

In one embodiment, stored information may further include purchase data including but not limited to: a customer's address, a customer's phone number, date of purchase, location of purchase, name of store, sales associate, the purchase price, service contract terms, or third party extended warranty. It should be noted that although the stored information pertaining to the manufacturer data will likely be loaded into the storage device of the appliance by the manufacturer, the purchase data will be loaded locally at the point of purchase. This flexible approach will allow all pertinent appliance information to be aggregated into the storage device of the appliance.

In one embodiment, the stored information is formatted in a manner that enables the appliance to provide the stored information in a format that is compatible with the appliance manufacturer's IVR system. For example, the appliance will play the touch tones in the order for which information is prompted by the IVR system (e.g. model number followed by serial number followed by date of manufacturing, and so on). For example, if an appliance customer also purchased a service contract, the storage device in the appliance may be updated at the point-of-sale such that the stored information is provided in a format compatible with a service provider. Note that the service contract may be with a third party provider.

In one embodiment, a universal standard can be established for interacting with appliances and retrieving information from the appliances. For example, a manufacturer or a group of manufacturers may set a standard as to how to interpret the sequence of DTMF signals. For example, the standard may dictate the order of presentation of the stored information. For example, the model number may be provided prior to serial number and so on. In this manner, there is no proprietary format for each manufacturer and the sequence of DTMF signals can be universally understood.

Using the present invention, when a customer calls the manufacturer (or the third party service provider), the customer simply holds the phone (such as a cordless phone) in close proximity to the appliance and presses a button to activate the reporting of stored information. The appliance then outputs the stored information in the form of touch tones (DTMF signals) to the phone. In this manner, the appliance information that is often lost or difficult to extract, is safely stored in the household appliance itself.

Furthermore, this novel invention is particularly useful if the appliance is sold to a different consumer. Since the appliance information is stored within the appliance, the new owner may easily extract the necessary appliance information when the need arises in the future.

In one embodiment, the current method for information retrieval from appliances can be used for automatic client registration, e.g., in place of sending in a registration card. In one embodiment, the automatic client registration over the phone may include associating the caller's telephone number with the IVR system such that future calls to the IVR system may use previously retrieved information. For example, if a customer calls to register an appliance, the customer may invoke the information retrieval process by pressing a button on the appliance. The stored information is then provided in a touchtone format to the service provider's system by holding a telephone handset next to the appliance's speaker. The next time the customer calls, the service provider may associate the caller's phone number with a registered appliance, and may simply use previously provided serial number, model number, etc. Hence, future customer calls may be accelerated without the need to prompt for detailed information from the customer again.

In one embodiment, the stored information includes sensor data and results of self diagnostic routines. For example, the results of diagnostic routines may be retrieved directly from the appliance, thereby assisting a manufacturer or a service provider in understanding the current condition of the appliance. The sensor data will greatly enhance a customer service representative's ability to interact with a consumer who is having problems with the appliance, thereby leading to greater customer satisfaction when the customer service representative is able to quickly diagnose the problem.

Figure 2:
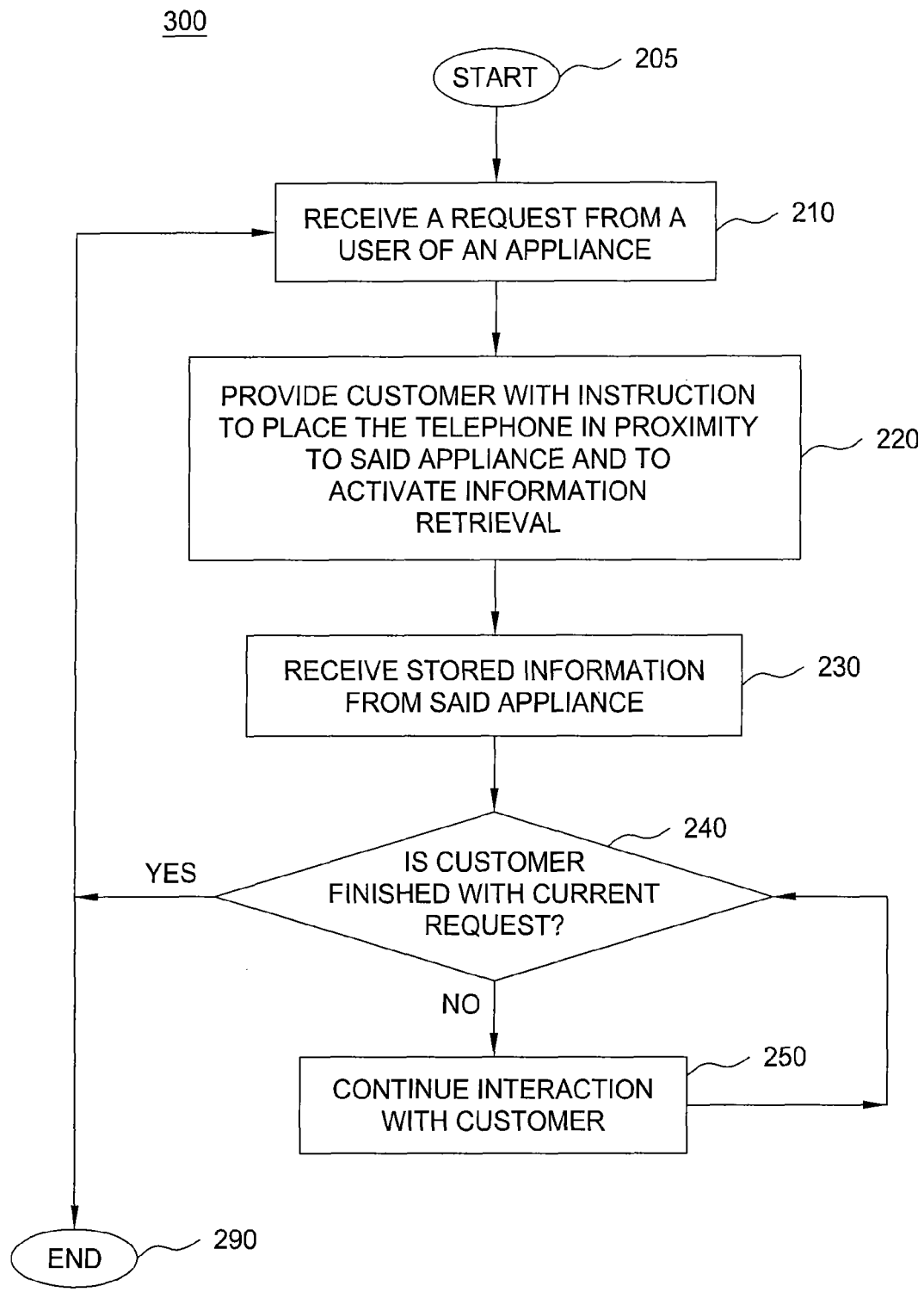
FIG. 2 illustrates a flowchart of a method for retrieving information from appliances.

FIG. 2 illustrates a flowchart of a method 200 for retrieving appliance information. For example, method 200 can be implemented by a manufacturer system 105 or a third party service system 106 for receiving Dual Tone Multi-Frequency (DTMF) signal from an appliance via a telephone system. The appliance may generate DTMF signals that correspond to stored information, e.g., manufacturer data, purchase data or sensor data, etc.

Method 200 starts in step 205 and proceeds to step 210. In step 210, method 200 receives a request (e.g., a telephony call request) from a user of an appliance. For example, an appliance customer calls a service center for registering a new appliance, for requesting maintenance or repair (e.g., a service appointment), etc.

In step 220, method 200 provides the customer with instruction to place the telephone in proximity to the appliance and to activate information retrieval (e.g., pressing a particular button on the appliance). For example, the manufacturer's IVR system instructs the customer to press a button on the instrument panel and to place the telephone handset next to the speaker.

In step 230, method 200 receives stored information from the appliance. For example, the DTMF signal generator in the appliance may provide the stored information such as manufacture data, sensor data, and/or purchase data to the IVR system.

In step 240, method 200 determines whether or not the customer is finished with current request. If the current request is completed, the method proceeds to step 290 to end the current request or returns to step 210 to continue receiving other calls. If the request is not completed, the method proceeds to step 250.

In step 250, method 200 may continue interaction with customer. For example, although the IVR system may have received the stored information, the customer may be calling for other purposes. For example, the customer may be calling to extend a warranty period. The method then proceeds back to step 240 to determine whether or not the customer is finished with the current request.

Figure 3:
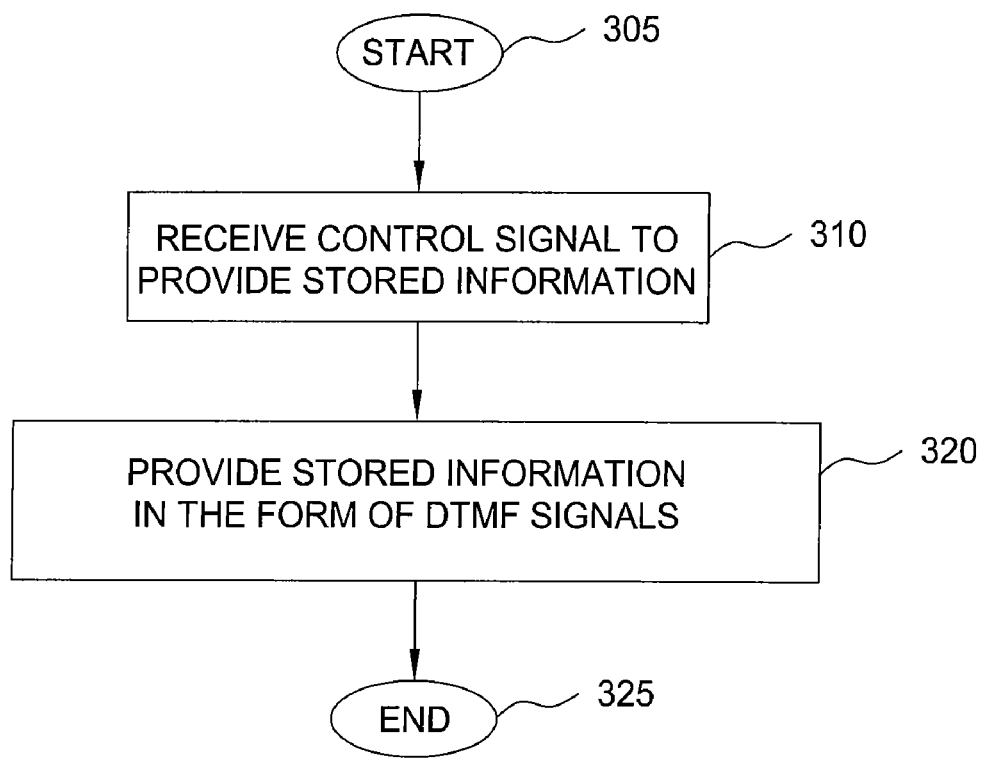
FIG. 3 illustrates a flowchart of a method for providing appliance information.

FIG. 3 illustrates a flowchart of a method 300 for providing appliance information. For example, method 300 can be implemented by an appliance for generating DTMF signals that correspond to stored information, e.g., manufacturer data, purchase data or sensor data, etc.

Method 300 starts in step 305 and proceeds to step 310. In step 310, method 300 receives a control signal to provide the stored information. For example, an appliance interface, e.g., a button, is activated at an appliance control panel by a user to retrieve the stored information.

In step 320, the stored information is provided via a speaker as one or more DTMF signals. It should be noted that the stored information may comprise manufacturer data, purchase data and/or sensor data. One or more of these type of data can be selectively output based on the received control signal. Method 300 ends in step 325.

Figure 4:
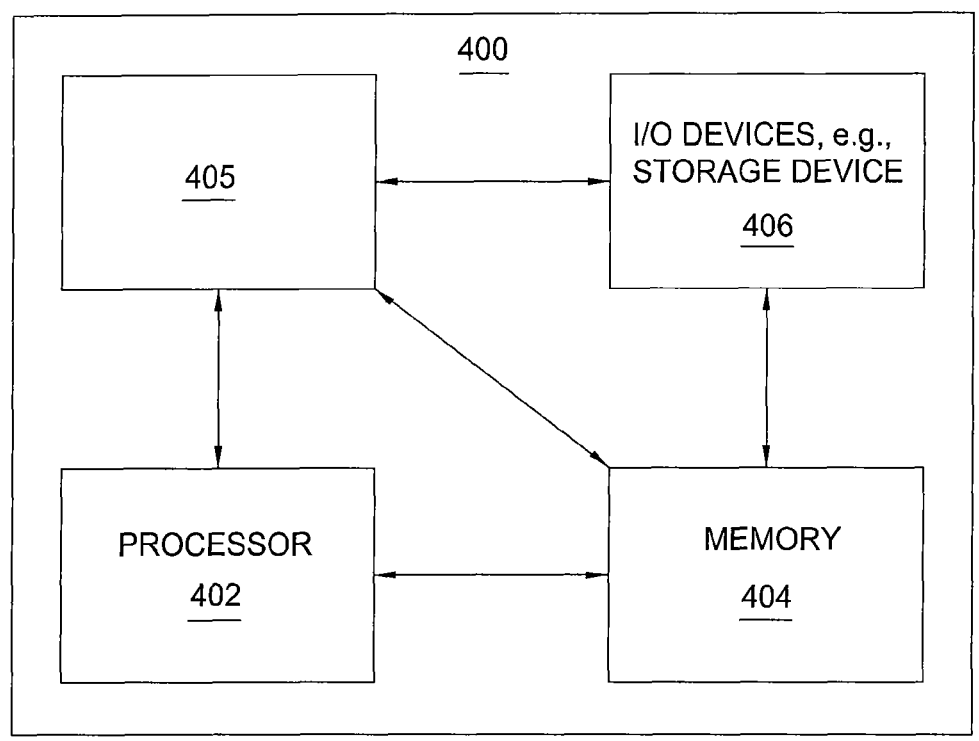
FIG. 4 illustrates a high-level block diagram of a general-purpose computer suitable for use in performing the functions described herein.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for retrieving or providing information from appliances, and various input/output devices 406 (e.g., storage devices, including but not limited to, a tape drive, a floppy drive, a hard disk drive or a compact disk drive, a receiver, a transmitter, a speaker, a display, a speech synthesizer, alarm interfaces or indicators, power relays, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present module or process 405 for retrieving or providing information from appliances can be loaded into memory 404 and executed by processor 402 to implement the functions as discussed above. As such, the present method 405 (e.g., method 200 or method 300) for retrieving or providing information from appliances (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for receiving information for an appliance, comprising:
   receiving a request from a user of an appliance; and
   receiving stored information from the appliance as a dual-tone multi-frequency signal.

2. The method of claim 1, wherein the dual-tone multi-frequency signal is received via a communication network.

3. The method of claim 1, wherein the stored information comprises sensor data.

4. The method of claim 1, wherein the stored information comprises manufacturer data.

5. The method of claim 1, wherein the stored information comprises purchase data.

6. The method of claim 3, wherein the sensor data comprises results from running a diagnostic routine.

7. The method of claim 1, wherein stored information is received by an interactive voice response system.

8. The method of claim 1, wherein the stored information is received to register the appliance.

9. The method of claim 1, wherein the stored information is received to schedule a service appointment for the appliance.

10. A method for providing information, comprising:
    receiving a control signal for providing stored information for an appliance; and
    providing the appliance information as a dual-tone multi-frequency signal.

11. The method of claim 10, wherein the dual-tone multi-frequency signal is provided by the appliance.

12. The method of claim 10, wherein the stored information comprises sensor data.

13. The method of claim 10, wherein the stored information comprises manufacturer data.

14. The method of claim 10, wherein the stored information comprises purchase data.

15. The method of claim 12, wherein the sensor data comprises results from running a diagnostic routine.

16. A computer-readable medium having stored thereon a plurality of instructions, the plurality of instructions including instructions which, when executed by a processor, cause the processor to perform method for providing information, comprising:
    receiving a control signal for providing stored information for an appliance; and
    providing the appliance information as a dual-tone multi-frequency signal.

17. The computer-readable medium of claim 16, wherein the dual-tone multi-frequency signal is provided by the appliance.

18. The computer-readable medium of claim 16, wherein the stored information comprises sensor data.

19. The computer-readable medium of claim 16, wherein the stored information comprises manufacturer data.

20. The computer-readable medium of claim 16, wherein the stored information comprises purchase data.

* * * * *